United States Patent
Kuempel et al.

(10) Patent No.: US 10,709,283 B2
(45) Date of Patent: Jul. 14, 2020

(54) FLOW-OPTIMIZED POUR OVER COFFEE BREWING SYSTEM

(71) Applicant: Blue Bottle Coffee, Inc., Oakland, CA (US)

(72) Inventors: Jeremy John Kuempel, Brisbane, CA (US); Christopher William Ledesma, Arcadia, CA (US); Thomas Drew Carlson, Oakland, CA (US); Neil M. Day, Jr., Portola Valley, CA (US)

(73) Assignee: Blue Bottle Coffee, Inc., Oakland, CA (US)

( * ) Notice: Subject to any disclaimer, the term of this patent is extended or adjusted under 35 U.S.C. 154(b) by 0 days.

(21) Appl. No.: 15/799,784

(22) Filed: Oct. 31, 2017

(65) Prior Publication Data

US 2018/0116441 A1     May 3, 2018

Related U.S. Application Data

(60) Provisional application No. 62/416,643, filed on Nov. 2, 2016, provisional application No. 62/415,503, filed on Oct. 31, 2016.

(51) Int. Cl.
*A47J 31/02*     (2006.01)

(52) U.S. Cl.
CPC .................................... *A47J 31/02* (2013.01)

(58) Field of Classification Search
CPC .. A47J 31/00; A47J 31/02; A47J 31/06; A47J 31/057
USPC .................................... 99/275, 300, 305, 306
See application file for complete search history.

(56) References Cited

U.S. PATENT DOCUMENTS

| | | | | |
|---|---|---|---|---|
| 865,572 | A * | 9/1907 | Dawson | B01D 29/085 |
| | | | | 141/297 |
| 3,334,574 | A * | 8/1967 | Douglas | A47J 31/02 |
| | | | | 210/455 |
| 4,577,080 | A * | 3/1986 | Grossman | A47J 31/547 |
| | | | | 219/689 |
| 4,728,425 | A * | 3/1988 | Sandvig | A47J 31/06 |
| | | | | 210/477 |
| 4,986,172 | A * | 1/1991 | Hunnicutt, Jr. | A47J 31/02 |
| | | | | 99/306 |
| 6,083,392 | A * | 7/2000 | Rigney | A47J 37/1271 |
| | | | | 210/451 |
| 9,717,365 | B2 * | 8/2017 | Geissler | A47J 31/3676 |

(Continued)

FOREIGN PATENT DOCUMENTS

| DE | 652010 C | 10/1937 |
|---|---|---|
| DE | 1197061 B | 7/1965 |

(Continued)

OTHER PUBLICATIONS

International Search Report, Application No. PCT/US2017/059591, dated Jan. 26, 2018, pp. 1-5.

*Primary Examiner* — Dana Ross
*Assistant Examiner* — Ayub A Maye
(74) *Attorney, Agent, or Firm* — Kilpatrick Townsend & Stockton LLP

(57) ABSTRACT

A pour-over coffee dripper is presented. The dripper includes a container having a first opening and a second opening of different sizes and a sidewall extending between the first opening and the second opening. Ridges are formed on an inside surface of the sidewall extending in straight lines between the first opening and the second opening.

18 Claims, 4 Drawing Sheets

(56) References Cited

U.S. PATENT DOCUMENTS

| | | | | |
|---|---|---|---|---|
| 9,801,495 | B2* | 10/2017 | Oh | A47J 31/4492 |
| 2007/0163447 | A1* | 7/2007 | Tremblay | A47J 31/08 |
| | | | | 99/295 |
| 2009/0242472 | A1* | 10/2009 | Wallerstorfer | A47J 31/605 |
| | | | | 210/232 |
| 2011/0005400 | A1* | 1/2011 | Tien | A47J 31/02 |
| | | | | 99/298 |
| 2012/0201933 | A1* | 8/2012 | Dran | B65D 85/8043 |
| | | | | 426/80 |
| 2014/0037803 | A1* | 2/2014 | Hansen | B65D 85/8043 |
| | | | | 426/115 |
| 2014/0053735 | A1* | 2/2014 | Verbeek | B65D 85/8043 |
| | | | | 99/295 |
| 2014/0174965 | A1* | 6/2014 | Herling | A47J 31/18 |
| | | | | 206/216 |
| 2018/0055272 | A1* | 3/2018 | Sachtleben | A47J 31/06 |

FOREIGN PATENT DOCUMENTS

| | | | |
|---|---|---|---|
| DE | 2160607 | A1 | 6/1973 |
| DE | 2609606 | B1 | 1/1977 |
| FR | 751732 | A | 9/1933 |
| JP | 11113752 | A * | 4/1999 |
| JP | 2008073136 | A * | 4/2008 |

* cited by examiner

FLOW-OPTIMIZED POUR OVER COFFEE BREWING SYSTEM

CROSS-REFERENCE TO RELATED APPLICATION(S)

This application claims the benefit of U.S. Provisional Patent Application No. 62/415,503 filed on Oct. 31, 2016 and U.S. Provisional Patent Application No. 62/416,643 filed on Nov. 2, 2016, the contents of which are incorporated by reference herein.

BACKGROUND

The inventive concept disclosed herein relates to a pour-over coffee dripper.

Coffee drinks are popular beverages enjoyed in various parts of the world, hot or cold. Coffee drinks have a wide range of taste and flavors depending on factors such as origin and type of coffee beans, roasting technique used, and the brewing method used. Each of these factors can have a significant impact on the flavor and aroma of the resulting coffee drink. For example, even using beans from one batch, using different brewing methods can produce coffee drinks that taste very different.

One of the brewing techniques that are available involves using a pour-over dripper ("dripper"). To brew a cup of coffee using a dripper, a filter is usually placed in the container that is generally shaped like a cup or bowl, coffee grounds are placed in the filter, and water is poured over the coffee grounds. The coffee flavors get extracted from the coffee grounds into the water with optimal contact time, and the flavored water is drained out of the dripper into a cup.

The dripper offers the advantage of allowing one cup of coffee to be made at a time, in addition to ease of cleaning that comes with simplicity of design (i.e., few parts or components). Furthermore, some users may find the experience of watching his coffee get brewed right on the table enjoyable and relaxing.

While there are several different coffee drippers on the market today made with different designs and materials, each product has its disadvantage. A dripper that will allow optimal extraction for improved flavor and aroma in the resulting drink is desired.

SUMMARY

The inventive concept pertains to a liquid dripper that is useful for making coffee. The liquid dripper includes a container having a first opening and a second opening of different sizes and a sidewall extending between the first opening and the second opening. Ridges are formed on an inside surface of the sidewall extending in straight lines between the first opening and the second opening.

DETAILED DESCRIPTION

The inventive concept pertains to a pour-over coffee dripper with a container that is optimized for water flow and heat retention that contribute to improved aroma and flavor of the resulting drink.

Figure 1:
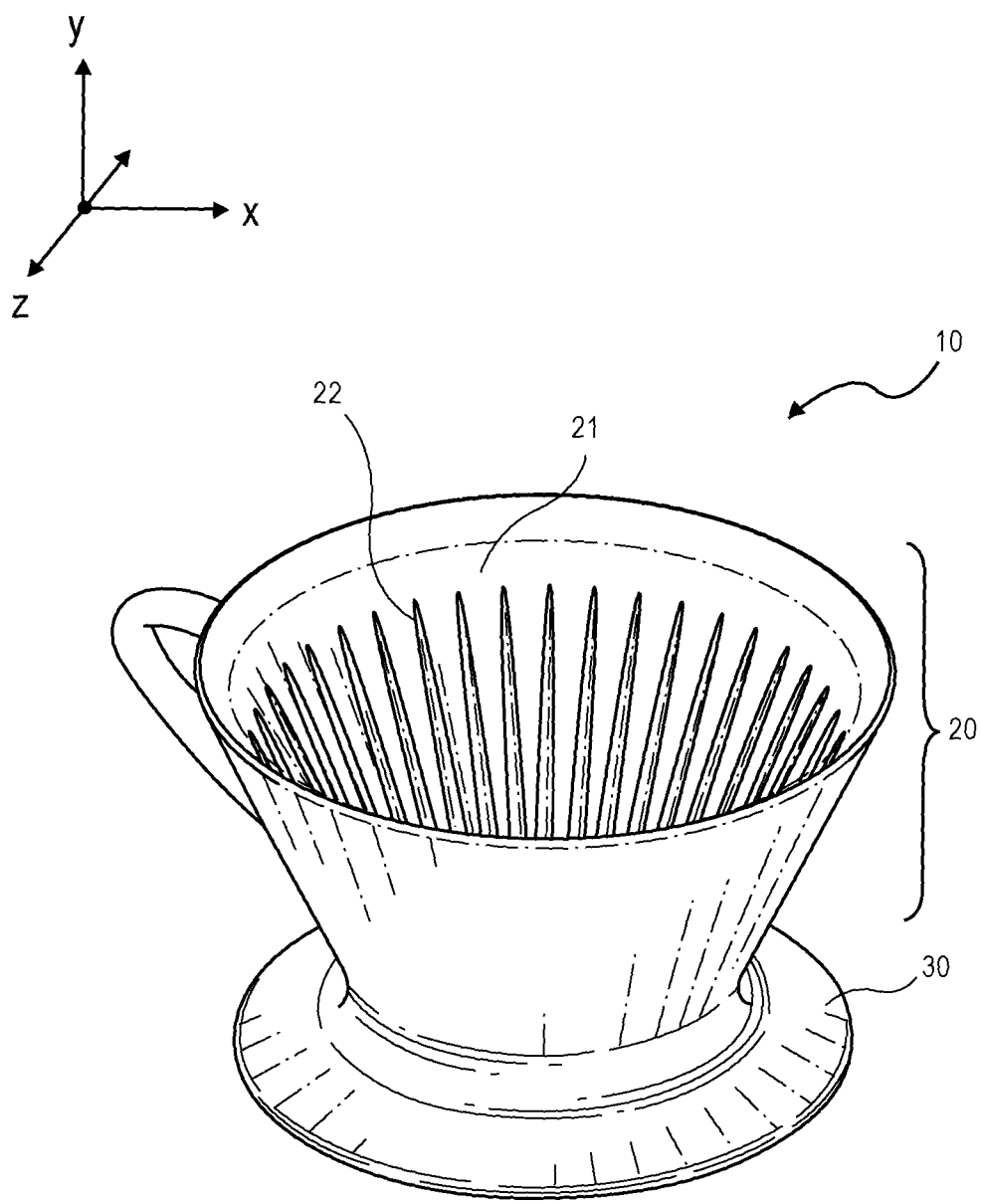
FIG. 1 is a perspective view of the dripper according to one embodiment.
Figure 4:
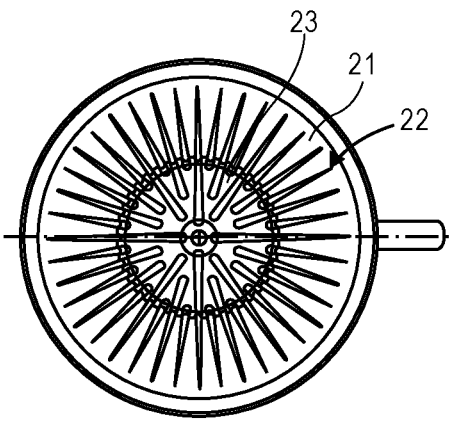
FIG. 4 is a top view of the dripper according to one embodiment.

FIG. 1 is a perspective view of a dripper 10 according to one embodiment. As shown, the dripper 10 has a container portion 20 attached to a base 30. In the particular embodiment, the container portion 20 has a first opening at the top that is useful for pouring liquid into the container portion 20 and a second opening through which the liquid exits the container portion 20. The second opening is formed in a bottom surface of the container portion 20 and is of a different size than the first opening. In the embodiment that is shown, the fist opening is larger than the second opening. The first opening and the bottom surface, in this particular example, lie in planes that are parallel to the x-z plane referring to the coordinates of FIG. 1. A sidewall 21 extends between the first opening and the bottom surface 23 (bottom surface 23 is shown in FIG. 4). In the particular embodiment shown, the first opening and the bottom surface 23 are both circular; however, this is not a limitation of the inventive concept. Ridges 22 are formed on the inside surface of the sidewall. The ridges 22 protrude inward from the sidewall 22 and extend in a straight line between the first opening and the second opening while following the contours of the sidewall 21.

In one embodiment, the dripper 10 is made of porcelain. More specifically, the dripper 10 may be manufactured using a material that can be made thin, provides for heat retention and low thermal mass while maintaining overall strength of the product. One example of a suitable material is a high-grade porcelain that is unique to the Kyushu region of Japan. This porcelain material is fired at an ultra-high temperature (>1300° C.) that results in a high level of durability. Firing the dripper at an ultra-high temperature also creates a smooth glaze which may reduce friction and improve fluid flow through the dripper 10.

In one embodiment, the container 20 is sized for a 350 mL cup. For example, the inner diameter at the top rim of the container 20 may be about 110 mm, the length of the slanted inner wall may be about 70 mm, and the inner diameter at the bottom of the container 20 may be about 47 mm. The shapes and measurements provided here are not intended to be limiting of the disclosure, and are just provided as an example. The inner dimensions may be optimized for a filter that is intended to be used with the dripper 10. In one embodiment, the weight of the dripper 10 does not exceed 290 g.

Figure 2:
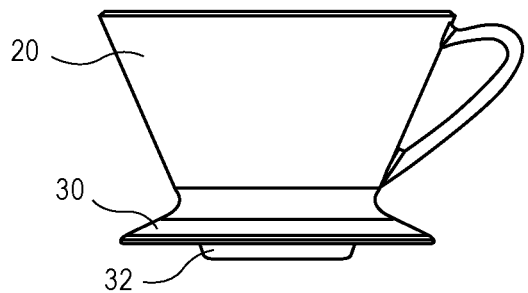
FIG. 2 is a side view of the dripper according to one embodiment.

FIG. 2 is a side view of the dripper 10. In the particular embodiment, the sidewall 21 of the container 20 is set at about 65.7° with respect to a vertical axis (not shown) orthogonal to the bottom surface 23 of the container 20. Any angle between 60-70° helps precise visual estimation of pour volume. While wider wall angles may be conducive to nicer flow property during a pour, a deeper/narrower wall angle is easier for certain pour techniques, such as a multiple-pour technique. A base 30 extends outward from an outer surface of the sidewall 21. The sidewall 21 extends past the base 30 to form an inner ring 32, such that the first opening and the inner ring 32 are on different sides of the base 30. The second opening is connected to a nozzle 50, which is surrounded by the inner ring 32. The nozzle 50 may be at a center of the inner ring 32.

Figure 3:
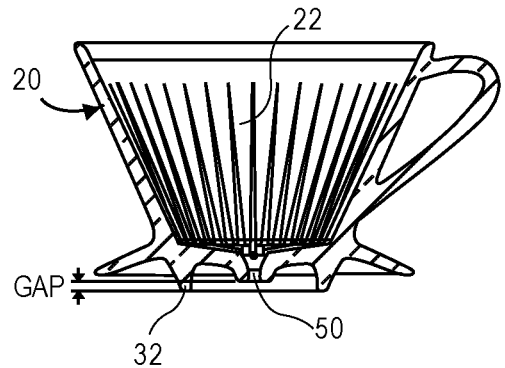
FIG. 3 is a cross-sectional side view of the dripper according to one embodiment.

FIG. 3 is a cross-sectional side view of the dripper 10 according to one embodiment. There may be a gap between a bottom of the inner ring 32 and the bottom of the nozzle 50 to ensure that the nozzle 50 does not come into contact with items or surfaces around it, such as a table surface. This gap preserves a sanitary zone. The gap may be about 3 mm high in the y-direction, although this is not a limitation of the inventive concept.

The cross-section view shows that the nozzle 50 does not have a constant diameter. The nozzle 50 is wider at the top, and narrows toward the outlet. At the narrowest point, the nozzle 50 may have a diameter of about 4-4.5 mm to provide for optimal flow rate and even extraction. The bottom of the container 20 is not flat but has a gradual slope down to the nozzle 50 to help the liquid flow. The shape and dimensions of the nozzle 50 ensure laminar flow profile of the liquid for smooth and consistent flowrate that contributes to a consistent extraction and flavor profile from cup to cup.

Figure 5:
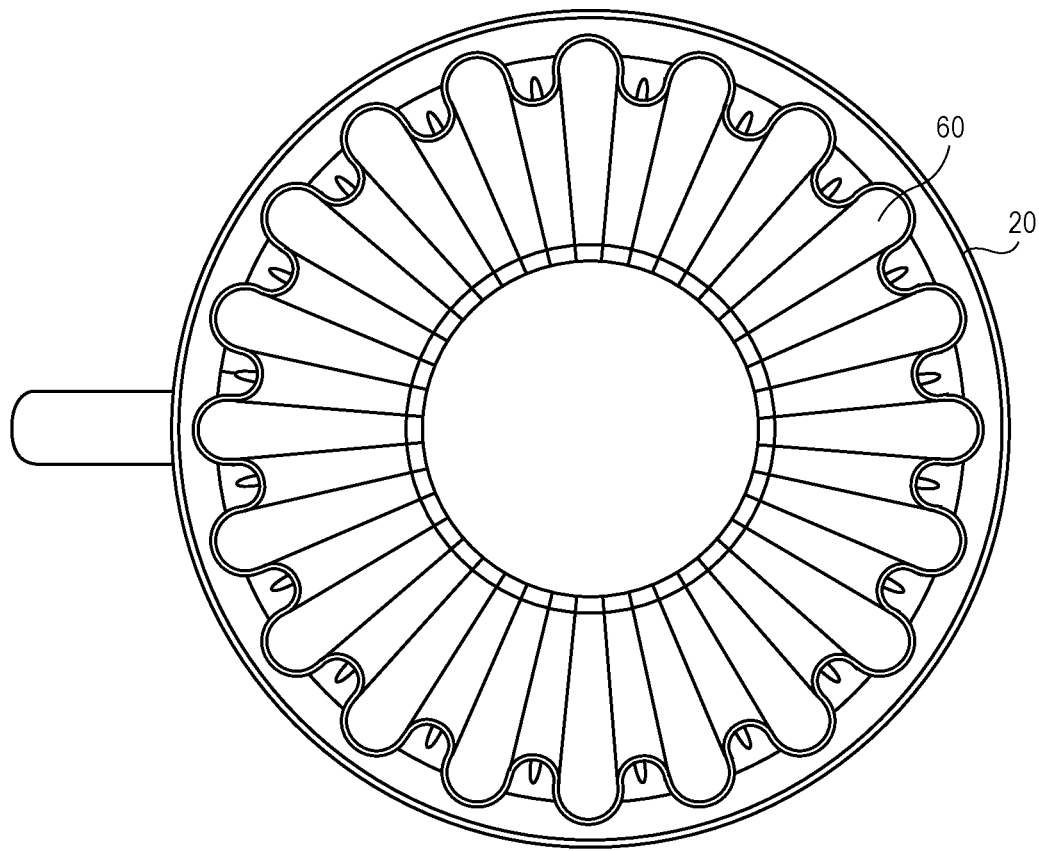
FIG. 5 is a top view of the dripper with a filter placed inside, according to one embodiment.

FIG. 4 is a top view of the dripper 10 according to one embodiment. As shown, there are ridges 22 formed on the inner wall of the container 20. The ridges 22 utilize capillary action to draw coffee across the filter. In the particular embodiment, there are 40 vertical ridges formed, making this dripper 10 usable with a filter that has 20 pleats. FIG. 5 depicts a top view of the container 20 with a filter 60 placed inside. Often, the filter medium is flavor-tuned to optimally brew coffee without pre-wetting. Not pre-wetting the filter allows the capillary zone to fill during bloom and reduces early drip-out.

Figure 6:
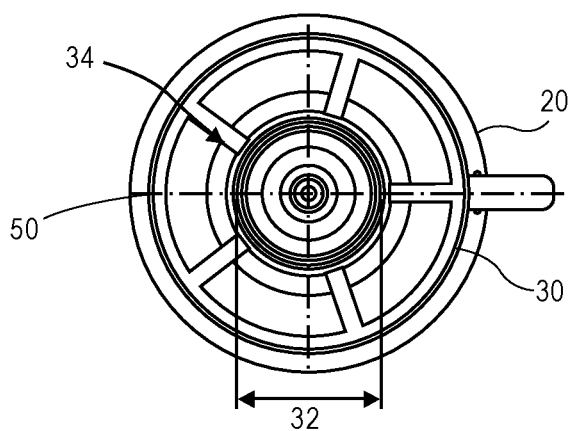
FIG. 6 is a bottom view of the dripper according to one embodiment.

FIG. 6 is a bottom view of the dripper 10 according to one embodiment. In this embodiment, there are five support ribs 34 extending from the outer edge of the base 30 toward the inner ring 32 to provide even support and balance on most carafes or cups. The diameter of the inner ring 32 is about the same as the diameter of the bottom of the container 20, or around 47 mm in one embodiment. A relatively small inner ring diameter allows the dripper 10 to sit comfortably on even a small vessel and let the liquid flow into the vessel.

The ridges 22 extend in a straight line between an area near the rim of the container 20 and the bottom of the container 20. In fact, the ridges 22 follow the slope, angle, and curve of where the sidewall meets the bottom, and extend onto the bottom surface of the container 20. All the ridges 22 extend toward the nozzle 50, but are of varying lengths. In the particular embodiment, there are four longest ridges 22 that are formed about 90° apart from one another, with ridges 22 of different lengths between them. Some of the ridges 22 extend only to where the bottom surface meets the sidewall, partly due to the limited real estate with the decrease in diameter in going from the rim to the bottom surface.

The ridges 22 protrude from the sidewall 21 inward, and are not of constant thickness or height, "height" being measured by how much it protrudes from the flat portion of the inner surface. Referring back to FIG. 4, the ridges 22 are higher and wider at the bottom of the container close to the second openin, and get narrower and shallower as they extend toward the first opening.

Figure 7:
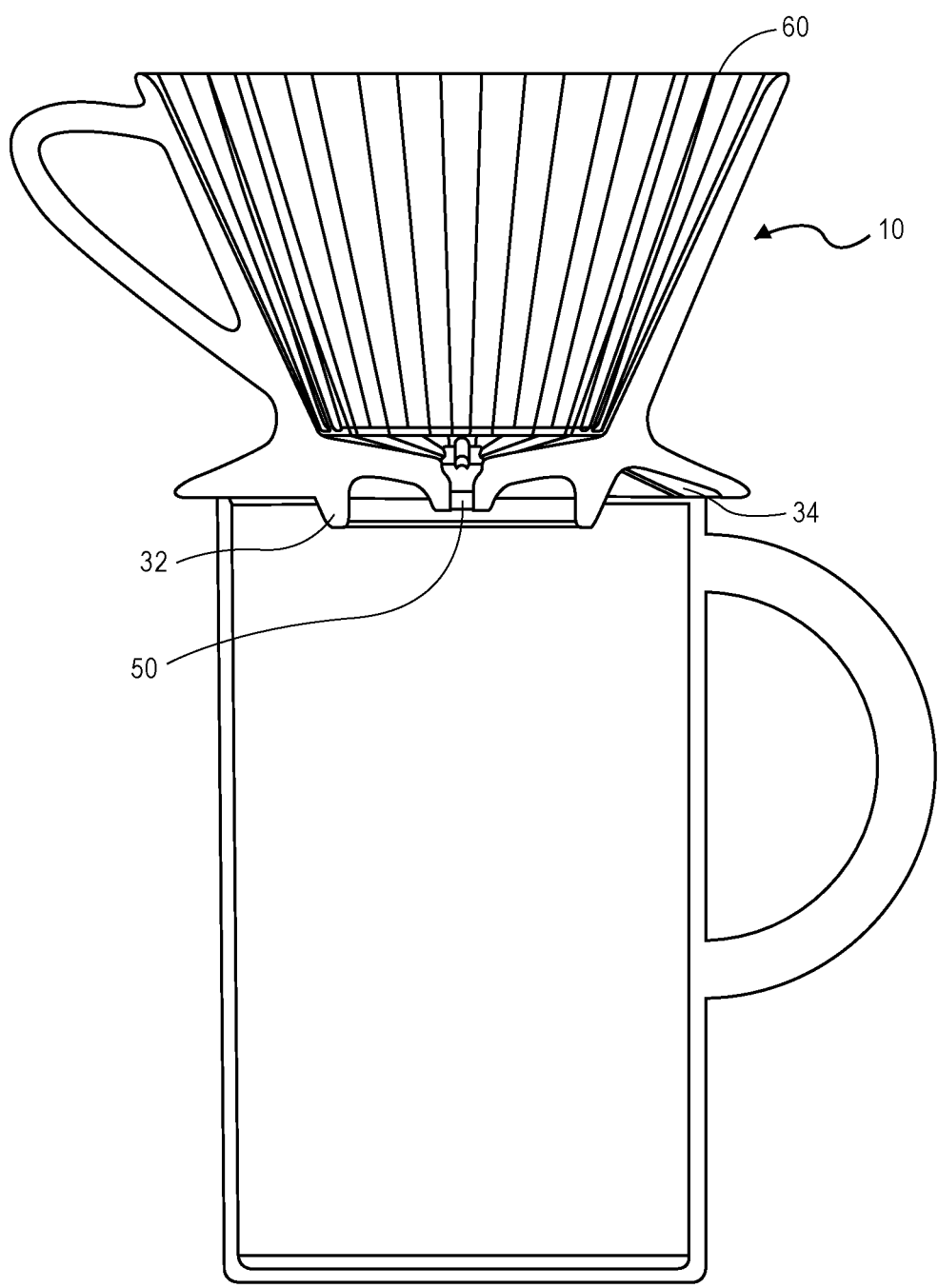
FIG. 7 depicts the dripper with the filter inside placed on a cup in accordance with one embodiment.

FIG. 7 depicts the dripper 10 with the filter 60 inside placed on a cup in accordance with one embodiment. As shown, the support ribs 34 rest securely on the wall of the cup, while liquid flows out of the nozzle 50 into the cup without encountering any obstructions.

It should be understood that the inventive concept can be practiced with modification and alteration within the spirit and scope of the disclosure. The description is not intended to be exhaustive or to limit the inventive concept to the precise form disclosed.

What is claimed is:

1. A pour-over coffee dripper, comprising:
   a container comprising a sidewall and a circular bottom, wherein an inner surface of the sidewall and a circular bottom surface of the circular bottom define a cavity configured to receive a coffee filter containing ground coffee beans, wherein the container defines a circular first opening at a top of the sidewall and a second opening extending through the circular bottom surface, wherein a diameter of the first opening is larger than a diameter of the circular bottom surface, wherein the inner surface of the sidewall extends from the diameter of the circular bottom surface to the first opening at an angle relative to the circular bottom surface, wherein the angle is between 150 degrees and 160 degrees so that the cavity is frustoconical in shape, wherein the container comprises a plurality of ridges on the inner surface of the sidewall and the circular bottom surface extending in straight lines between the first opening and the second opening, and wherein the container is configured so that coffee made from pouring water into the coffee filter containing the ground coffee beans runs down the inner surface of the sidewall, across the circular bottom surface, and out of the second opening;
   a base extending outwardly from an outer surface of the sidewall, and
   an inner ring on an opposite side of the base than the container and having an inner diameter the same as a diameter of the circular bottom surface, and
   wherein the first opening is on one side of the base and the inner ring is on an opposite side of the base.

2. The pour-over coffee dripper of claim 1, wherein a central vertical axis of the container passes through a center of the first opening and a center of the circular bottom surface.

3. The pour-over coffee dripper of claim 1, wherein the dripper is composed of porcelain from Kyushu region of Japan.

4. The pour-over coffee dripper of claim 2, wherein the second opening defines a nozzle configured to regulate a flow of the coffee exiting the container, wherein the nozzle is located at the center of the circular bottom surface, wherein the nozzle tapers from a wider portion at a top to a narrower portion toward a bottom, and wherein the nozzle extends from the circular bottom surface less than the inner ring so that a bottom of the inner ring and not the nozzle will contact a flat surface when the inner ring is placed on a flat surface.

5. The pour-over coffee dripper of claim 2, wherein the plurality of ridges are in a radial pattern around the central vertical axis in a horizontal plan view,
   wherein the plurality of ridges comprise ridges of different lengths, and
   wherein none of the ridges intersect each other.

6. The pour-over coffee dripper of claim 2, wherein the inner surface of the sidewall is angled relative to the central vertical axis at 65.7 degrees.

7. The pour-over coffee dripper of claim 2, wherein the diameter of the first opening is 110 mm, wherein the diameter of the circular bottom surface is 47 mm, and wherein a length of the sidewall between the first opening and the circular bottom surface is 70 mm.

8. The pour-over coffee dripper of claim 3, wherein the porcelain of the dripper is fired at more than 1300 degrees Celsius in order to form a smooth glaze on the inner surface of the sidewall, circular bottom surface, and nozzle to create a path with low friction and high fluid flow for the coffee.

9. The pour-over coffee dripper of claim 4, further comprising a plurality of support ribs on a bottom side of the base,
 wherein the base extends outwardly and downwardly from the sidewall so as to be at a non-perpendicular angle to the central vertical axis,
 wherein the plurality of support ribs extend from a perimeter of the bottom side of the base toward and terminate at the inner ring, and
 wherein bottom sides of the plurality of support ribs define an even support surface on a horizontal plane perpendicular to the central vertical axis configured so as to balance on a cup.

10. The pour-over coffee dripper of claim 4, wherein the nozzle has a diameter at a narrowest point between 4 mm and 4.5 mm.

11. The pour-over coffee dripper of claim 5, wherein the plurality of ridges comprise four longest ridges, longer than the other ridges, wherein the longest ridges are positioned in the radial pattern about 90-degrees apart from one another.

12. The pour-over coffee dripper of claim 5, wherein at least a portion of the plurality of ridges extend from the inner surface of the sidewall onto the circular bottom surface.

13. The pour-over coffee dripper of claim 5, wherein the plurality of ridges widen in a direction parallel to surfaces from which the plurality of ridges extend as the plurality of ridges approach the second opening.

14. The pour-over coffee dripper of claim 13, wherein the plurality of ridges thicken in height in a direction perpendicular to surfaces from which the plurality of ridges extend as the plurality of ridges approach the second opening.

15. The pour-over coffee dripper of claim 12, wherein at least a portion some of the plurality of ridges do not extend onto the circular bottom surface.

16. The pour-over coffee dripper of claim 12, further comprising the filter, wherein the filter comprises 20 pleats,
 wherein the plurality of ridges comprise 40 ridges, and
 wherein the filter is positioned between the first opening and the second opening.

17. The pour-over coffee dripper of claim 14, wherein the circular bottom surface slopes downwardly from the diameter of the circular bottom surface to the nozzle.

18. The pour-over coffee dripper of claim 16, wherein the filter and plurality of ridges are configured to draw the coffee from inside the filter, through the filter, and into a capillary zone between the filter and the inner surface of the sidewall with capillary action.

\* \* \* \* \*